(12) United States Patent
Kogure et al.

(10) Patent No.: US 7,619,649 B2
(45) Date of Patent: Nov. 17, 2009

(54) VEHICLE FRONT-VIEW MONITORING SYSTEM

(75) Inventors: Masaru Kogure, Mitaka (JP); Yutaka Hiwatashi, Mitaka (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 695 days.

(21) Appl. No.: 09/902,576

(22) Filed: Jul. 12, 2001

(65) Prior Publication Data
US 2002/0018119 A1 Feb. 14, 2002

(30) Foreign Application Priority Data
Jul. 12, 2000 (JP) .............................. 2000-211835

(51) Int. Cl.
*H04N 7/18* (2006.01)
(52) U.S. Cl. ....................................................... 348/148
(58) Field of Classification Search ................. 348/148, 348/116, 118; 340/937; 382/103, 109, 106
See application file for complete search history.

(56) References Cited

U.S. PATENT DOCUMENTS

| | | | | |
|---|---|---|---|---|
| 4,833,469 A | * | 5/1989 | David ......................... | 340/901 |
| 4,899,296 A | * | 2/1990 | Khattak ....................... | 702/40 |
| 5,243,663 A | * | 9/1993 | Kudoh ........................ | 382/104 |
| 5,410,346 A | * | 4/1995 | Saneyoshi et al. ........... | 348/116 |
| 5,535,144 A | | 7/1996 | Kise | |
| 5,617,085 A | | 4/1997 | Tsutsumi et al. | |
| 5,955,941 A | * | 9/1999 | Pruksch et al. .............. | 340/435 |
| 6,013,911 A | * | 1/2000 | Hibbard et al. ............. | 250/205 |
| 6,091,833 A | * | 7/2000 | Yasui et al. .................. | 382/104 |
| 6,282,478 B1 | * | 8/2001 | Akita .......................... | 701/70 |
| 6,285,393 B1 | * | 9/2001 | Shimoura et al. ........... | 348/119 |
| 6,477,260 B1 | * | 11/2002 | Shimomura ................. | 382/106 |
| 6,549,124 B1 | * | 4/2003 | Ishikawa et al. ............ | 340/435 |
| 6,587,573 B1 | * | 7/2003 | Stam et al. ................... | 382/104 |
| 6,636,257 B1 | * | 10/2003 | Harada et al. ............... | 348/148 |
| 6,760,061 B1 | * | 7/2004 | Glier et al. ................... | 348/149 |
| 2003/0103141 A1 | * | 6/2003 | Bechtel et al. .............. | 348/148 |

FOREIGN PATENT DOCUMENTS

| | | |
|---|---|---|
| EP | 0 738 872 A2 | 10/1996 |
| EP | 0 933 725 A2 | 8/1999 |
| JP | 05-265547 | 10/1993 |
| JP | 7-89364 | 4/1995 |
| JP | 2001-092970 | 4/2001 |

OTHER PUBLICATIONS

European Search report corresponding to European Application No. 01306022.3—1224 dated Mar. 20, 2008.
Goldbeck, J. et al., "Lane Detection and Tracking by Video Sensors", *Intelligent Transportation Systems*, Proceedings, 1999 IEEE/IEEJ/JSAI International Conference, Tokyo, Japan, Oct. 5-8, 1999, pp. 74-79.

* cited by examiner

*Primary Examiner*—David Czekaj
(74) *Attorney, Agent, or Firm*—Smith, Gambrell & Russell, LLP

(57) ABSTRACT

A vehicle front-view monitoring system determines whether there is a fail occurring on the monitoring system based on luminance data on an image of a front view taken by camera and takes fail-safe measures if the fail is occurring. The luminance data indicates luminance-distribution characteristic values indicating horizontal luminance-distribution on the image. A fail can be determined based on a parameter obtained by normalizing the luminance-distribution characteristic values by a shutter speed for the camera equipment.

29 Claims, 9 Drawing Sheets

VEHICLE FRONT-VIEW MONITORING SYSTEM

BACKGROUND OF THE INVENTION

The present invention relates to a vehicle front-view monitoring system having a function of taking fail-safe measures against images irregularly monitored due to sunlight interfering.

The vehicle front-view monitoring system having CCD cameras has recently attracted much attention. The system recognizes driving conditions such as a distance to a vehicle travelling ahead based on images taken by the cameras and warns a driver of danger or controls the vehicle such as by shiftdowns.

Recognition of the driving conditions using a stereo-distance measuring technique obtains a positional difference (parallax) on an object in a pair of the images and calculates the distance to the vehicle travelling ahead by trigonometrical survey.

Such a vehicle front-view monitoring system requires fail-safe measures for securing safety driving. A failure to be detected is a fault monitoring condition such that the vehicle in front is beyond recognition while monitoring cameras are facing weak sunlight.

Image monitoring failures are discussed with reference to FIGS. 1 to 3.

When monitoring vehicles traveling ahead (FIG. 1) while facing weak sunlight, disc-like diffusion could appear on the monitored image, as illustrated on the left-upper side in FIG. 2, due to saturation of luminance. Such a disc-like diffusion appearing on the monitored image while the vehicle is facing the sunlight is called a sunlight-diffusion disc hereinafter. These sunlight-diffusion discs cause the saturation of pixel luminance on the disc areas and the surrounding areas. A correct image data therefore can not be obtained, or vehicles in front are masked by the sunlight-diffusion discs, which results in monitoring failures. Moreover, the disc edges have a big luminance change between adjacent pixels in the horizontal direction and hence incorrect distance data could be calculated on the edges.

FIG. 3 illustrates distance-data calculation based on stereo images (a reference image and an image to be compared such as shown in FIG. 1).

In FIG. 3, black sections have a big luminance change between the adjacent pixels in the horizontal direction. These sections carry distance data (depth). The intensities of most pixels in the sunlight-diffusion disc area have been saturated, so that no distance data is calculated in this area (a lost state). Moreover, the disc edges have a big luminance change in the horizontal direction, so that the incorrect distance data could be calculated.

Securing the safety driving in such a fault condition due to a generation of the sunlight-diffusion discs discussed above requires the fail-safe measures to temporarily halt the monitoring function.

SUMMARY OF THE INVENTION

A purpose of the present invention is to provide a vehicle front-view monitoring system for monitoring optical irregularities occurring on monitored images and swiftly taking fail-safe measures.

The present invention provides the vehicle front-view monitoring system for taking the fail-safe measures comprising: a camera device for taking an image of a view in front; a calculator for calculating luminance data on the image; and a determination section for determining whether there is a fail occurring on the monitoring system based on the luminance data, the fail-safe measures being taken if the fail is occurring.

DETAILED DESCRIPTION OF PREFERRED EMBODIMENTS

Preferred embodiments according to the present invention will be disclosed with reference to the attached drawings.

Figure 1:
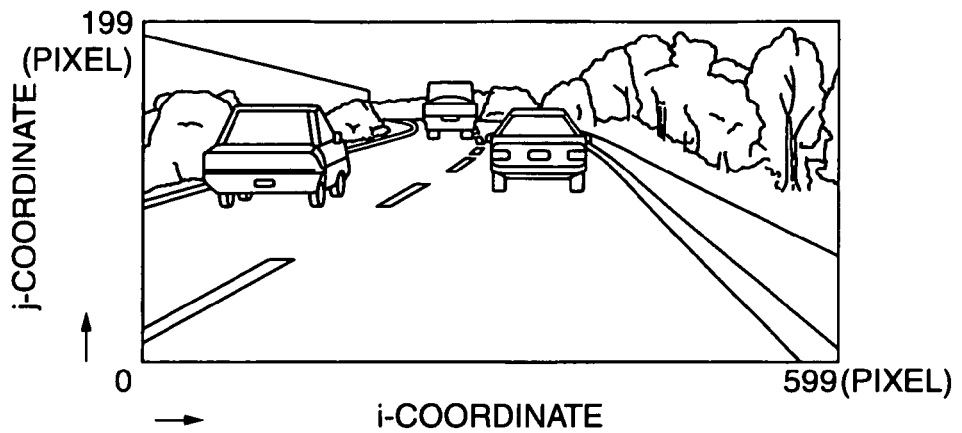
FIG. 1 illustrates a normal image monitored on a monitor screen.

FIG. 1 shows a block diagram of a preferred embodiment of a vehicle front-view monitoring system according to the present invention.

A pair of cameras 1 and 2 having image sensors such as CCDs are attached to a vehicle such as an automobile in the vicinity of tires with a predetermined distance (corresponding to camera-baseline length) in the direction of vehicle width, for taking images ahead.

The main camera 1 (right camera) takes a reference image required for stereo processing whereas the sub-camera 2 (left camera) takes an image to be compared.

Analog images taken by the cameras 1 and 2 while the main camera 1 and sub-camera 2 are synchronized with each other are converted into a specific luminance gradation (for example, gray scale at 256 gradations).

The digitized images are processed by an image correcting section 5 for correction of luminance, image geometrical conversion, etc. An inevitable misalignment on the cameras 1 and 2 will affect left and right images. Such effect can be cancelled by geometrical conversion such as an image rotation and a parallel shift with Affine conversion, etc. Luminance data on the stereo images (a reference image and an image to be compared) for one frame corrected by the image correcting section 5 are stored in an image memory 8.

The luminance data are further supplied to a stereo-image processor 6 for calculating distance data (parallax for each object). Each distance data corresponds to a positional deviation on the same object in the stereo images. An actual distance to the object is defined on the basis of parallax by a trigonometrical survey. The distance data for one frame thus obtained are stored in a distance-data memory 7.

The luminance data and the distance data are supplied to a microcomputer 9.

The microcomputer 9 includes a road-recognizing section 10, a three-dimensional (3-D) object-recognizing section 11, a fail-determining section 12 and a processor 13.

In response to the luminance and distance data, the road-recognizing section 10 recognizes the condition of a road ahead, and the 3-D object-recognizing section 11 recognizes three-dimensional objects (vehicles travelling ahead).

Based on the data from the sections 10 and 11, the processor 13 warns the driver of a danger via a warning device 19 such as a display or a speaker when it determines that the warning is necessary.

Moreover, the processor 13 controls several controllers 14 to 18 if necessary. For instance, it sends a command signal to an automatic transmission (AT) controller 14 for downshifts or to an engine controller 18 for an engine power-down. The processor 13 may further sends the command signals to an antilock-braking system (ABS) controller 15, a traction control system (TCS) controller 16 and a vehicle controller 17 for controlling an engine speed and a torque distribution to tires, and etc.

The fail-determining section 12 determines whether the cameras 1 and 2 are taking the images into the sun and a fail is occurring, based on the luminance and the distance data stored in the image memory 8. The vehicle and the warning controls are interrupted by the fail-safe measures for prevention of malfunction which could otherwise occur due to lowering in monitoring accuracy during a period of determination in that a fail is occurring, or of "1" set for a fail flag NG which will be described later.

Figure 5:
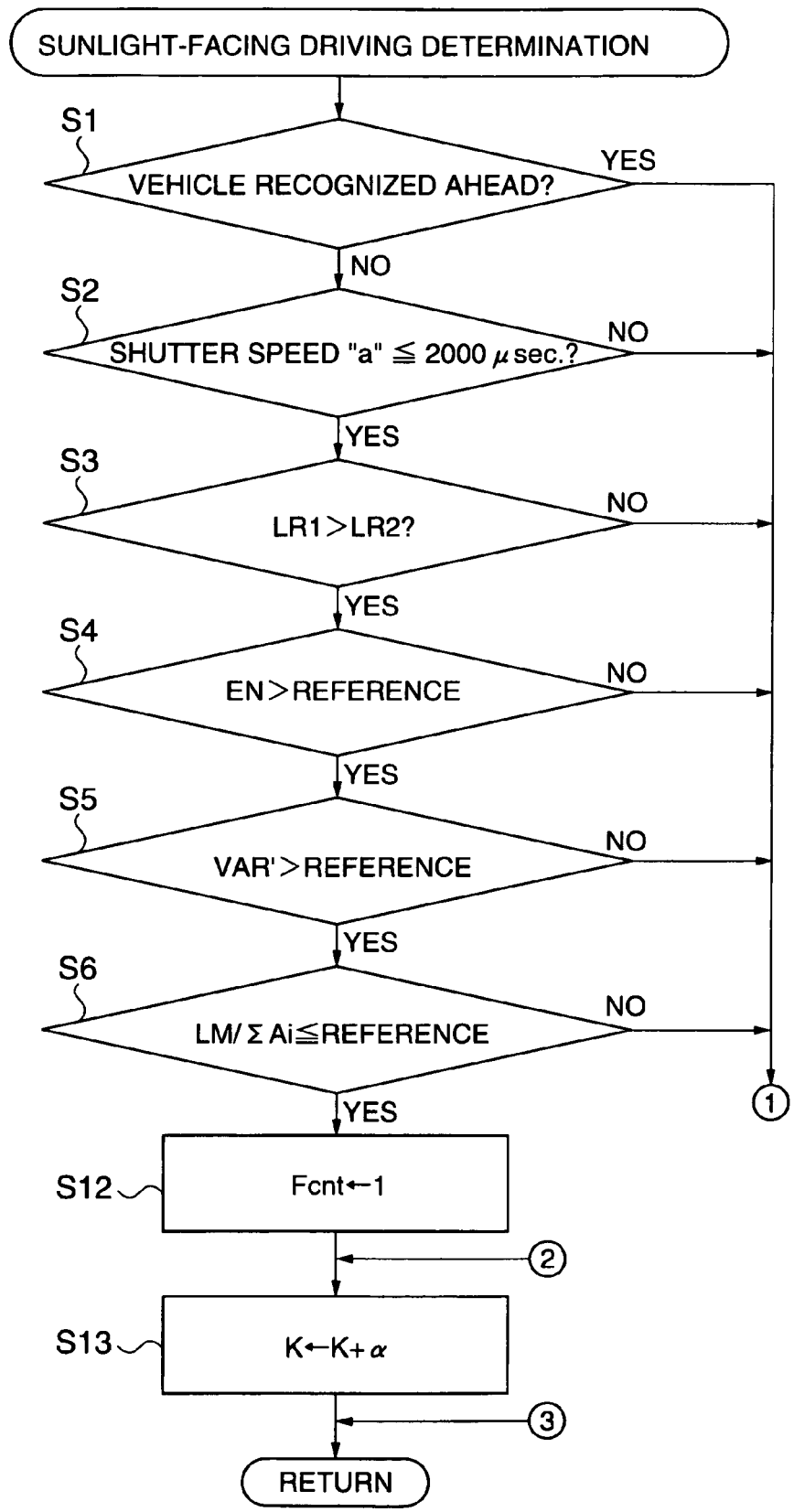
FIG. 5 shows a flow chart of a weak-sunlight-facing driving determination routine.
Figure 6:
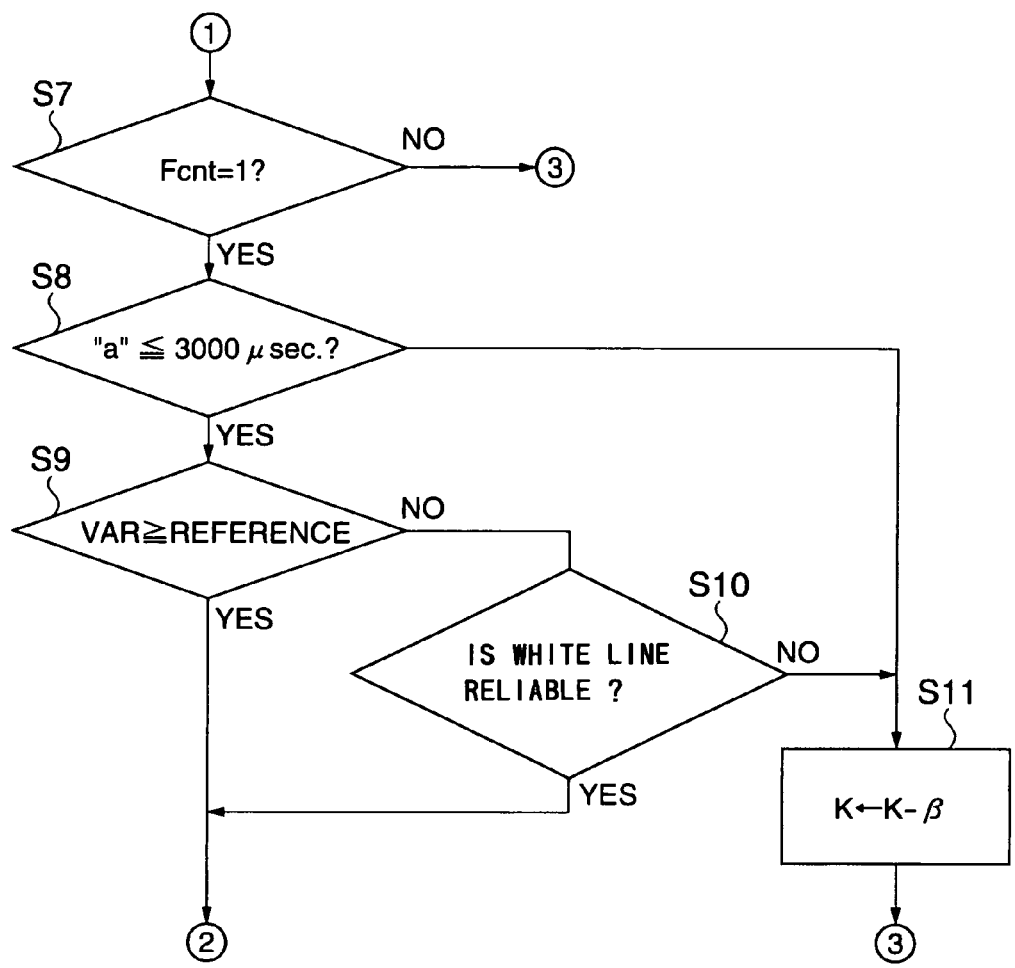
FIG. 6 shows a flow chart of a weak-sunlight-facing driving determination routine.

FIGS. 5 and 6 show flowcharts for indicating a routine of determining whether the cameras 1 and 2 are taking images into the sun while the vehicle is facing the sunlight, which is called a sunlight-facing driving hereinafter. The routine is repeated by the fail-determining section 12 by a predetermined interval (a cycle of 100 ms for example).

The requirements for taking the fail-safe measures (called fail-safe measure-interruption requirements hereinafter) are discussed before explaining the routine in detail.

Requirements for steps S1 to S6 are necessary for taking the fail-safe measures in the present invention. It is determined that the cameras 1 and 2 are taking the images into the sun only when all the fail-safe measure-interruption requirements are met in steps Si to S6 and the routine proceeds to step S12 whereas to step S7 if not met in any one of steps S1 to S6.

As disclosed later, the fail determining section 12 determines whether the fail-safe measure-interruption requirement or a fail-safe measure-release requirement is met and performs counter increment or decrement in accordance with a result of determination. The fail-safe measure-release requirements are the requirements for resuming functions that have been interrupted by taking the fail-safe measures.

The interruption requirements are required for determining whether the cameras 1 and 2 are taking images into the sun, so that the fail-safe measures should be taken. A counter increment is performed when an interruption requirement is met. The fail-safe measures will never be taken before the counter reaches a predetermined value, even if the interruption requirements are met.

The release requirements are required for determining whether to halt the counter increment. In the present invention, the counter starts a count-up when an interruption requirement is met and continues until a release requirement is met even though monitoring situation is changing and no interruption requirement is met anymore.

The present invention deploys the following six interruption requirements for taking fail-safe measures, however, any combination of at least two of the requirements or addition of other requirements are available.

First Requirement: No vehicle is recognized ahead, or no distance to a vehicle in front is calculated (step S1).

Figure 2:
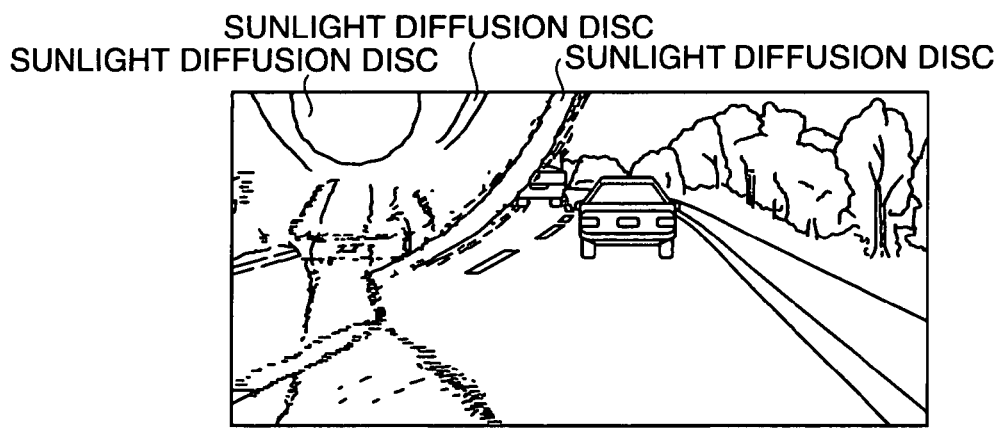
FIG. 2 illustrates an irregular image monitored on the monitor screen on which sunlight-diffusion discs are generated.
Figure 3:
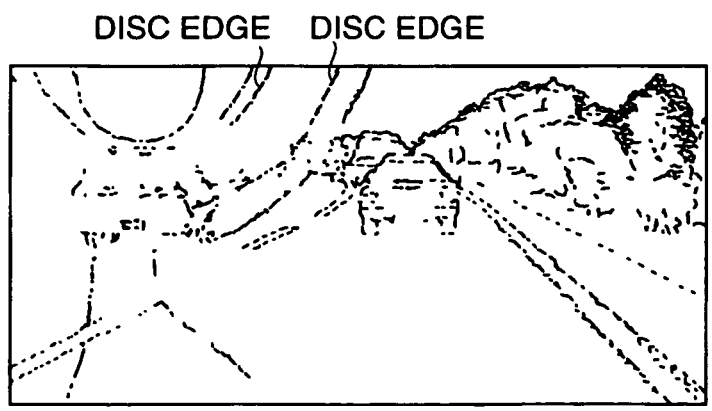
FIG. 3 illustrates the irregular image monitored on the monitor screen, including inaccurate distance data due to generation of sunlight-diffusion discs.
Figure 4:
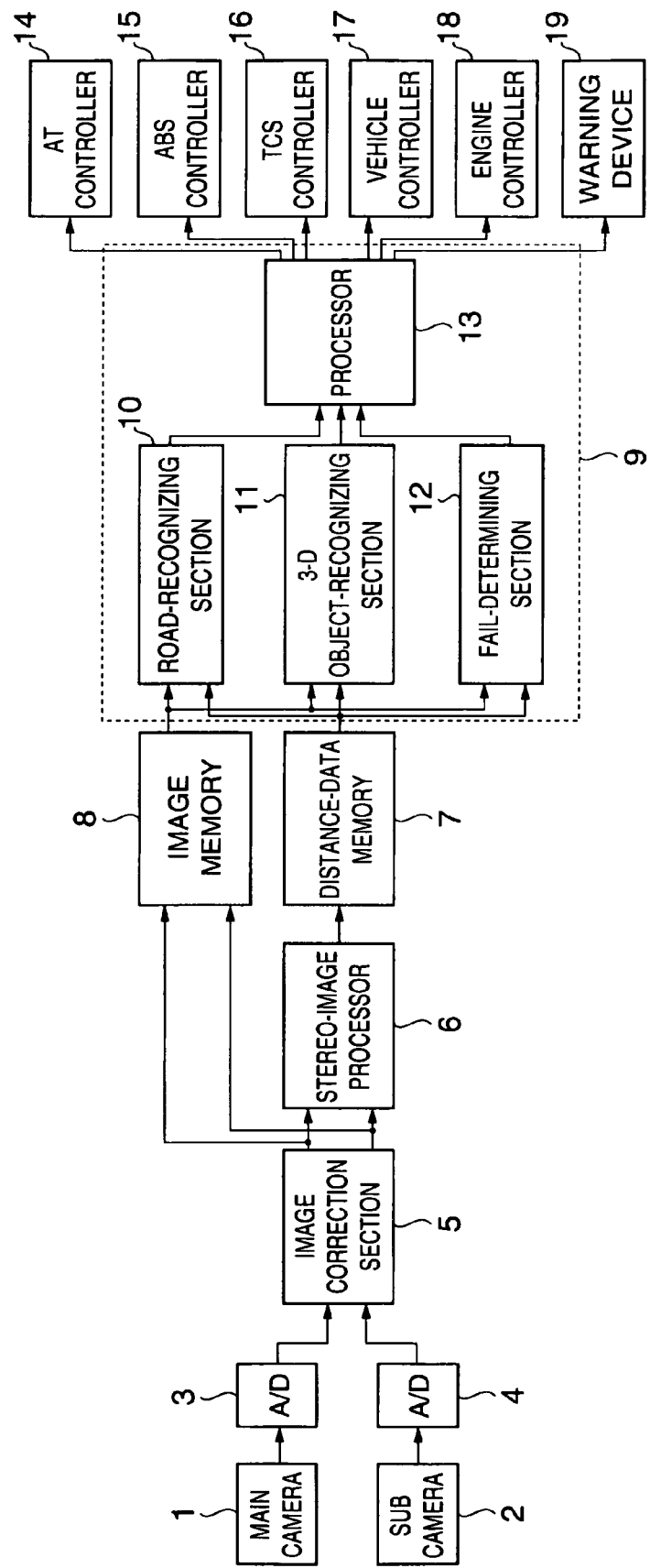
FIG. 4 is a block diagram of a preferred embodiment of the vehicle front-view monitoring system according to the present invention.

The fail-safe measures will be taken in the present invention when the cameras 1 and 2 are taking the images into the sun (sunlight-facing driving condition) so that the vehicle that actually traveling ahead is lost on a monitor screen of the monitoring system. In other words, the fail-safe measures will not be taken even though the sunlight-diffusion discs shown in FIG. 2 are appearing while the vehicle traveling ahead is recognized.

The present invention therefore deploys a decision in that no vehicles are recognized ahead as a fail-safe measure-interruption requirement. This decision step is executed even though no vehicles actually exist ahead.

When the requirement in step S1 (FIG. 5) is met, the routine proceeds to step S2 to determine whether the cameras 1 and 2 are taking the images into the sun (sunlight-facing driving condition).

Calculation of the distance to the vehicle in front in step S1 is explained before disclosing the step S2.

The distance to the vehicle in front is calculated in combination of a stereo-distance measuring technique and an image-recognition technique.

Calculated first is a lane model that indicates a three-dimensional shape of a road ahead. Lane markings painted on the left and right sides of a lane and displayed on the monitor screen have the luminance higher than that of the road surface. The markings are extracted as areas having luminance edges on the borders between that and the road surface.

The parallax on the lane thus extracted is calculated for each (4×4)-pixel block, for example. A two-dimensional position and the parallax in the monitored image for one pixel block in which the lane is displayed provide a three-dimensional position and a distance of the lane portion by using a known coordinate conversion formulas.

The calculated three-dimensional lane distribution is approximated into a straight line for a predetermined segment. The straight lines are connected into a polygonal line for calculating the lane model.

The vehicle travelling ahead is recognized as a three-dimensional object existing on the area (road surface) surrounded by left and right lane models. The distance to the vehicle in front is calculated based on the parallax of the object.

These techniques are disclosed in detail in Japanese Patent Application No. 11-269578 (road recognition) and Japanese Unexamined Patent Publication No. 5-265547 (recognition of vehicle traveling ahead).

Second Requirement: A shutter speed "a" is equal to or lower than a predetermined reference speed (step S2).

The shutter speed tends to be higher in a sunlight-facing driving condition in that the vehicle in front is missing on the monitor screen than that in a usual driving condition. In view of this tendency, an appropriate reference shutter speed such as 2000 μsec is set.

The present invention deploys a decision in that the shutter speed "a" is lower than this reference shutter speed as a fail-safe measure-interruption requirement.

The shutter speed, however, tends to be extremely higher against a strong sunlight in mid-summer, for example 200 μsec. or lower. In view of this tendency, the routine proceeds to step S3 (FIG. 5) when the requirements in steps S1 and S2 are both met.

Third Requirement: The upper luminance saturation factor LR1 is larger than the lower luminance saturation factor LR2 (step S3).

Sunlight-diffusion discs images shown in FIG. 2 will be generated on the upper side of the monitor screen when a vehicle in front is missing during sunlight-facing driving. This phenomenon has a tendency in that the luminance saturates on the upper side.

Figure 7:
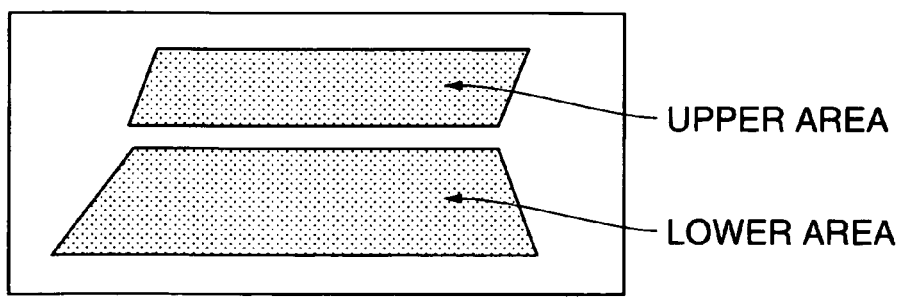
FIG. 7 illustrates the upper and lower areas set on the monitor screen.

In view of this tendency, as illustrated in FIG. 7, the upper and the lower areas are provided in a reference image.

The present invention deploys the decision in that the upper luminance saturation factor LR1 in the upper area is larger than that of the lower luminance saturation factor LR2 in the lower area as a fail-safe measure-interruption requirement.

The luminance saturation factors LR1 and LR2 correspond to a ratio of the number of pixels for which luminance has saturated (for example, the luminance 240 or more) to the total number of pixels in the upper and the lower areas, respectively.

The requirement in step S3 could be met even though no sunlight-diffusion discs (FIG. 2) are generated when there is no shielding in a fair day or while travelling on a bridge. In view of this, the routine proceeds to step S4 (FIG. 5) when the requirements in steps S1, S2 and S3 are all met.

No reference values are set for the upper and lower luminance saturation factors LR1 and LR2 in this embodiment. This is because factors tend to vary very largely according to the driving conditions. Particularly, the lower factor LR2 often becomes zero in a normal driving condition.

Fourth Requirement: The number of luminance edges EN for an area of the vehicle in front is smaller than a predetermined reference number (step S4).

While the vehicle travelling ahead is missing on the monitor screen during the sunlight-facing driving, the number of the luminance edges EN on the sunlight-diffusion disc area (FIG. 2) tends to become extremely small.

The number of the luminance edges EN indicates the number of a pair of adjacent pixels in the horizontal direction on the monitor screen for which variation in luminance is more than a predetermined reference value.

Figure 8:
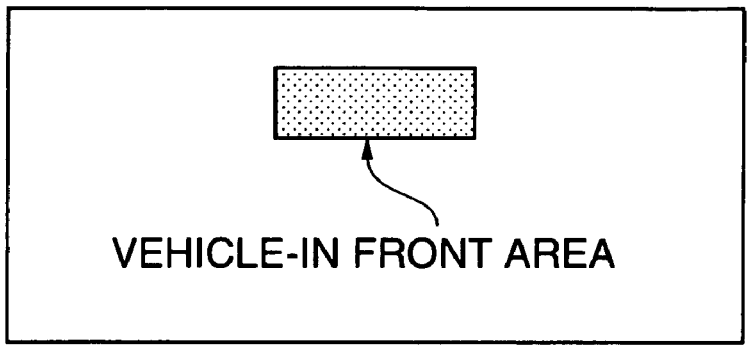
FIG. 8 illustrates an area on which a vehicle travelling ahead is monitored.

As illustrated in FIG. 8, a vehicle in front area is set in the upper-mid section of the monitor screen, in which the vehicle travelling ahead would be displayed.

The present invention deploys the decision in that the number of the luminance edges EN in the vehicle in front area (FIG. 5) is smaller than an appropriate reference number as a fail-safe measure-interruption requirement.

This requirement could, however, be met in driving at night, in tunnel, mist, smoke or on a snowy road. In view of this, the routine proceeds to step S5 (FIG. 5) when the requirements in steps S1, S2, S3 and S4 are all met.

The number of the calculation of the distance data in the vehicle in front area can be used instead of the number of the luminance edges EN. This is because the number of the luminance edges EN and the number of the calculation of the distance data have a strong correlation in a stereo-matching, or the lager the number of the luminance edges EN, the larger the number of the calculation of the distance data.

Fifth Requirement: The luminance-distribution-characteristics parameter normalized by using a shutter speed "a" meets a requirement.

Figure 9:
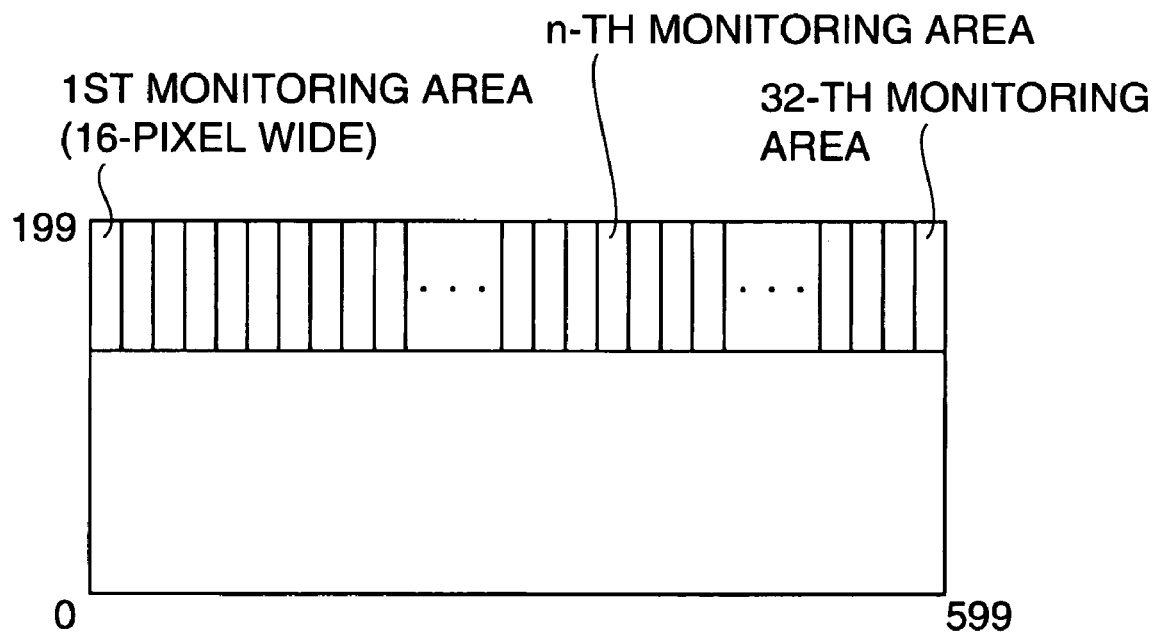
FIG. 9 illustrates a monitoring area.

As shown in FIG. 9, several slit-like monitoring areas Ni are arranged on the upper side of the monitor screen in the horizontal direction. The reason for the arrangement of monitoring areas Ni on the upper side is that the luminance mostly varies on the upper side when the vehicle is facing a weak sunlight.

The monitoring areas Ni are provided for evaluating the luminance-distribution characteristics for a monitored image in the horizontal direction.

For example, a reference image is divided into blocks of 16 pixels each in the horizontal direction when the reference image is composed of 200 and 512 pixels in the vertical and horizontal directions, respectively. Therefore, 32 monitoring areas Ni of (200×16) pixels are set.

Calculated next is addition of luminance Ai for each monitoring area Ni. The addition of luminance Ai for a monitoring area Ni can be calculated by adding the luminance of sample pixels that are uniformly distributed over the monitoring area Ni. The added luminance of the sample pixels may further be averaged.

The addition of luminance Ai is the value, for example, obtained by adding the luminance of 4 pixels sampled in the horizontal and vertical directions each. Pixels uniformly distributed over the monitoring area Ni can be used for calculating the luminance over the area Ni with less amount of calculation. The addition of luminance Ai can be calculated for all pixels involved in the area Ni if the amount of calculation is out of question.

The Ai-distribution characteristics for the 32 monitoring areas corresponds to the image distribution characteristics in the horizontal (lateral) direction.

The parameter (luminance-distribution characteristic value) that indicates luminance-distribution characteristics on the addition of luminance Ai is normalized by a shutter speed "a". Used here as the parameter is luminance-addition variance VAR that indicates a variance in the addition of luminance Ai. Luminance-addition variance VAR' normalized by the shutter speed "a", called a normalized luminance-addition variance VAR', is calculated by the following equations:

$$VAR' = VAR/a$$

$$VAR^2 = \{(A1-A_{ave})^2 + (A2-A_{ave})^2 + \ldots (An-A_{ave})^2\}/n = \Sigma(Ai^2)/n - (\Sigma Ai/n)^2 \quad (1)$$

The normalized luminance-addition variance VAR' as the luminance-distribution-characteristics parameter requires a decision in that the VAR' is larger than an appropriate reference value as of fail-safe measure-interruption requirement.

Instead of the VAR', the maximum addition of luminance Amax that indicates the maximum (peak) of the addition of luminance Ai can be used as the luminance-distribution-characteristics parameter.

The Amax requires a decision in that the maximum addition of luminance Amax' normalized by the shutter speed "a", called normalized maximum addition of luminance Amax', is larger than an appropriate reference value as a fail-safe measure-interruption requirement.

Another decision in that both the normalized VAR' and the normalized Amax' are larger than the corresponding appropriate reference values can be used as a fail-safe measure-interruption requirement.

The reason for using the normalized VAR' and Amax' for determination of whether the vehicle is facing the weak sunlight is discussed with reference to FIGS. 10 and 11.

Figure 10:
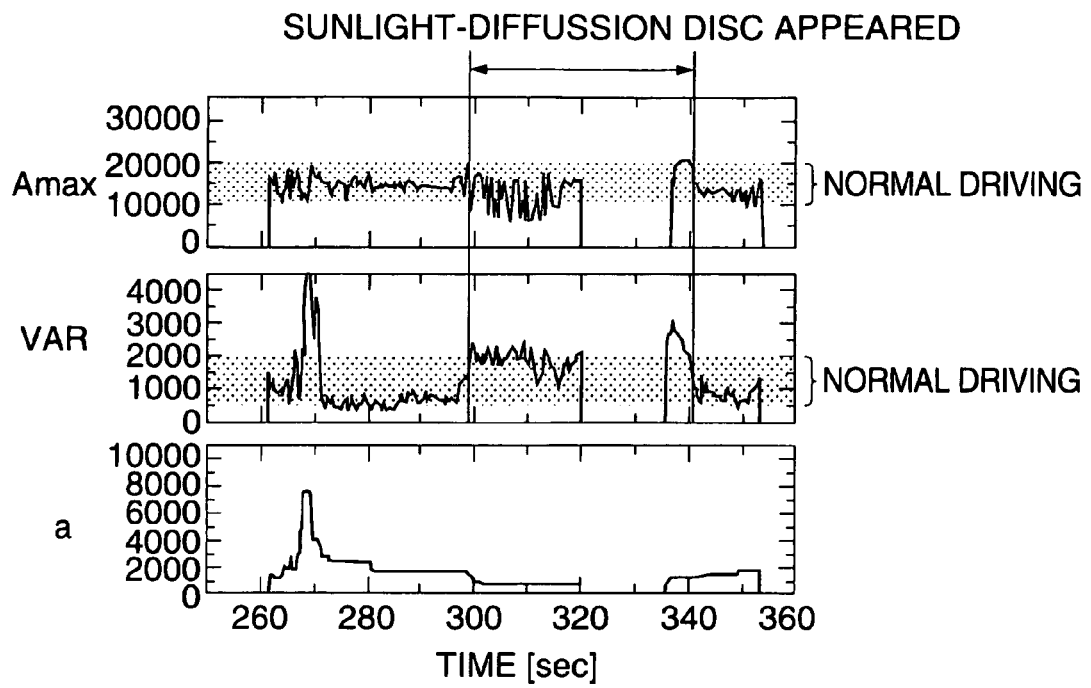
FIG. 10 illustrates measured luminance-distribution characteristic parameters.

FIG. 10 shows the un-normalized characteristics of the luminance-distribution-characteristics parameters (VAR and Amax) that were measured in an actual driving test. Images were taken into the weak sunlight from about 300 sec. to about 340 sec. after the start of measurement.

The measurement of Amax teaches that Amax was measured in a fixed range through the test and hence it is difficult to find out an extreme tendency on a weak-sunlight-facing driving.

The measurement of VAR shows a peak on about 270 sec. after the start of measurement, which appeared while the vehicle was not facing the sun, and hence it is also difficult to find out an extreme tendency on the weak-sunlight-facing driving.

Figure 11:
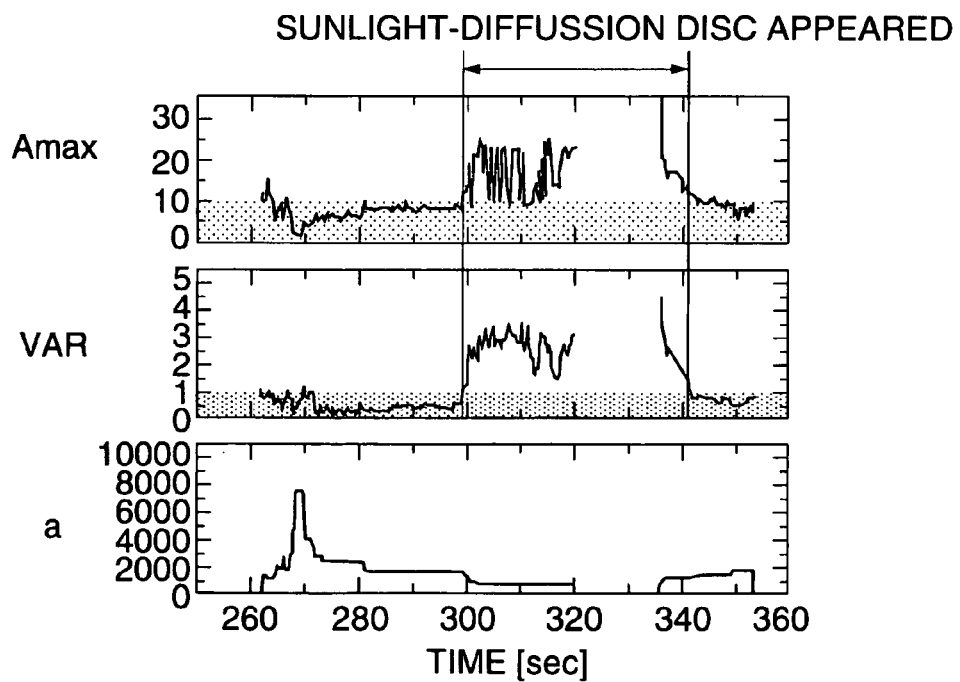
FIG. 11 illustrates normalized luminance-distribution characteristic parameters.

FIG. 11 shows the normalized characteristics of the luminance-distribution characteristics parameters (VAR' and Amax').

Compared to the test results shown in FIG. 10, the results in FIG. 11 show an extreme tendency in which both VAR' and Amax' are extremely increased while the vehicle is facing the weak sunlight.

It is therefore apparent that these parameters VAR' and Amax' can be used effectively for determining whether the vehicle is facing the weak sunlight.

Accordingly, the present invention employs the parameters Amax' and VAR' that are obtained by normalizing the parameters Amax and VAR with a shutter speed "a" for determination of the weak sunlight-facing driving in view of the fact that Amax and VAR are the functions of the shutter speed "a".

The decision in that both Amax' and VAR' are larger than the corresponding reference values as a fail-safe measure-interruption requirement further enhances accuracy of determination on fail-safe measurements.

The shutter speed, however, tends to be higher in a fair day, and hence the routine proceeds to step S6 (FIG. 5) when the requirements in steps S1, S2, S3, S4 and S5 are all met.

Six requirement: Division of the luminance moment by the total addition of the luminance is equal to or lower than a reference value (step S6).

Step S6 evaluates the distribution of addition of luminance Ai for each monitoring area Ni from the point of view which is different from step S5.

Figure 12A:
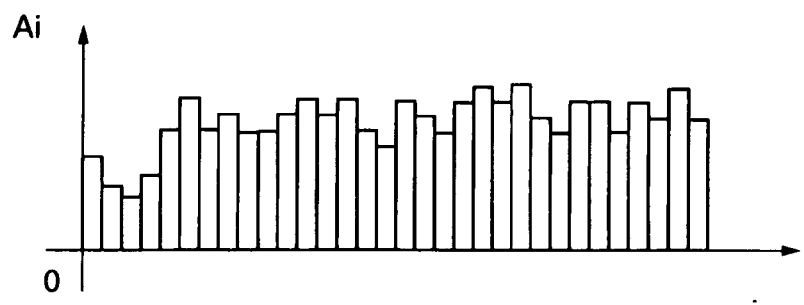
FIGS. 12A and 12B illustrate luminance addition characteristics in normal driving.
Figure 12B:
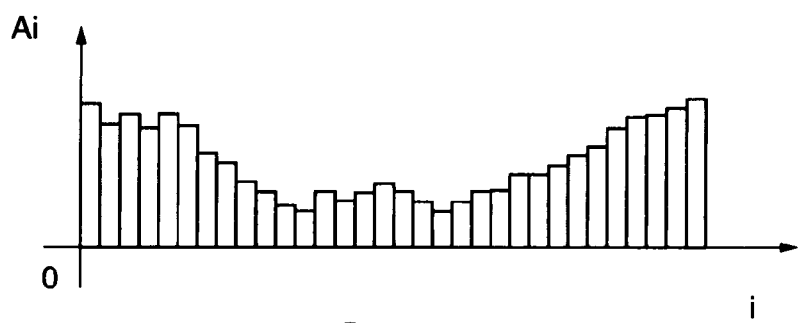

FIGS. 12A and 12B show the distribution characteristics of the addition of luminance Ai in regular conditions.

In detail, FIG. 12A shows an example of the distribution characteristics for a driving condition such that a vehicle is entering a freeway, so that the sky is displayed all over the upper section of the monitor screen.

FIG. 12B shows another example of the distribution characteristics for a driving condition such that the vehicle is travelling on a road uncovered with snow, which is displayed in the mid section of the monitoring screen, while the ground besides the road has been covered with snow.

Figure 13A:
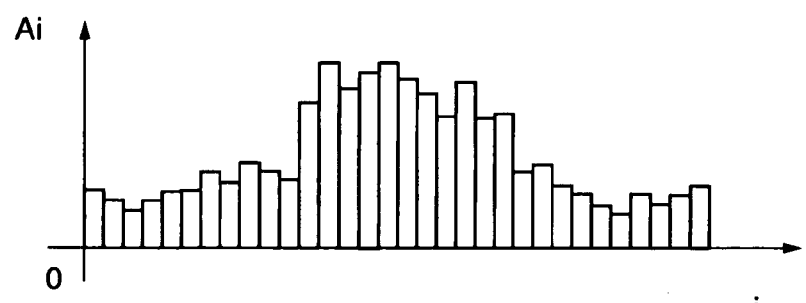
FIGS. 13A and 13B illustrate luminance addition characteristics in weak-sunlight-facing driving.
Figure 13B:
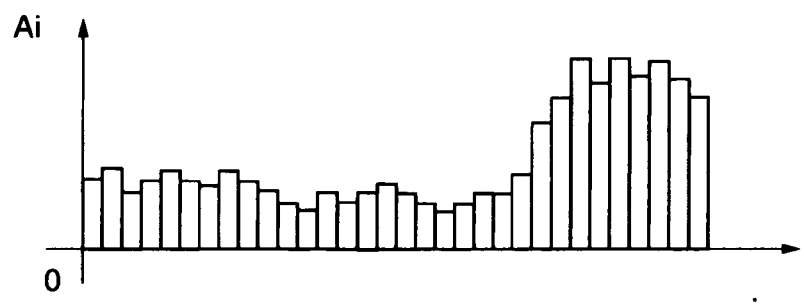

On the other hand, FIGS. 13A and 13B show the distribution characteristics of the addition of luminance Ai while the cameras 1 and 2 is facing a weak sunlight during the sunlight-facing driving.

The weak-sunlight-facing driving results in a tendency in that high luminance portions being converged on one section corresponding to the sunlight-diffusion disc (FIG. 2) of a monitored image in the horizontal direction. This is shown in FIG. 13A in which the high luminance portions are converged on the mid section of the monitor screen. FIG. 13B shows high luminance portions converged on the right section of the monitor screen.

Step S6 determines whether the present driving condition is a regular one such as shown in FIG. 12A or 12B or the weak-sunlight-facing driving such as shown in FIG. 13A or 13B.

For this determination, a luminance center LC and a luminance moment LM are introduced as defined in the following equations:

$$LC = \Sigma(i \times Ai)/\Sigma Ai$$

$$LM = \Sigma(|i-LC| \times Ai) \qquad (2)$$

where "i" indicates a monitoring area Ni- number (0 to 31) and Ai indicates an addition of the luminance Ai in the i-th monitoring area Ni, like in step S5.

The luminance center LC is defined as a horizontal position at which the addition of luminance Ai in the horizontal direction are converged. The LC is obtained by dividing the total of the product of Ai×"i" (=horizontal position) by the total of Ai.

Figure 14A:
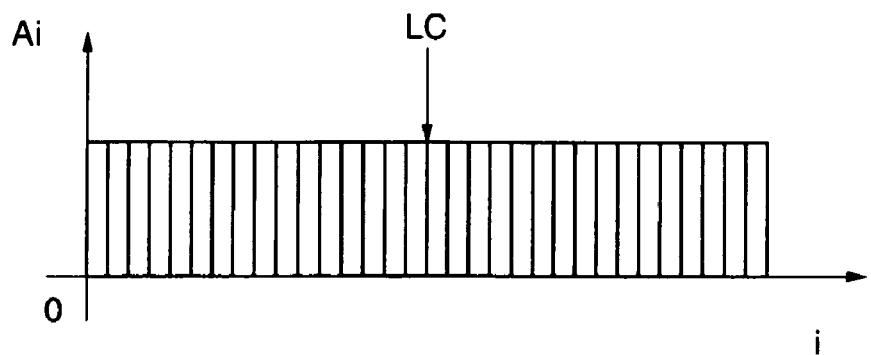
FIGS. 14A to 14C illustrate luminance center.
Figure 14B:
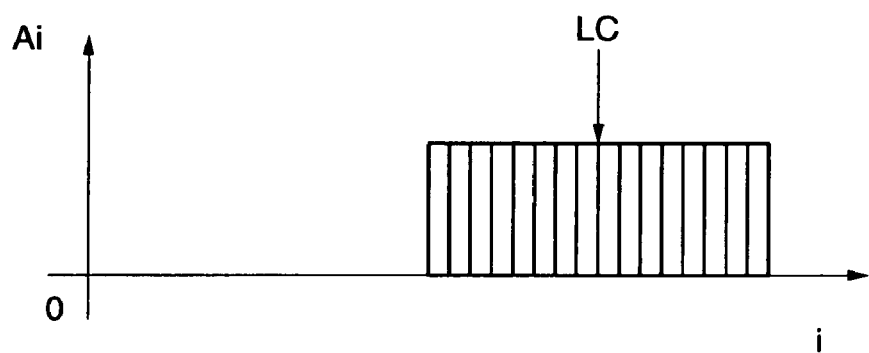

For example, when all of the addition of luminance Ai are the same value as shown in FIG. 14A, the luminance center LC is 15.5 that lies between 0 and 31. Moreover, when the addition of luminance A0 to A15 are all zero and A16 to A31 are the same value ($\neq 0$), the luminance center LC is 23.5.

The luminance moment LM is defined as the total of the product of a distance from the luminance center LC to a horizontal position "i" times the addition of luminance Ai. The moment LM indicates the distribution of the addition of luminance Ai in the horizontal direction on the basis of the luminance center LC. The luminance moment LM becomes small when the addition of luminance Ai is small in overall or the luminance is converged in the vicinity of the luminance center LC.

Calculated next is the value obtained by dividing the luminance moment LC by the total of addition of luminance $\Sigma Ai$, or luminance moment LM' that is normalized by $\Sigma Ai$ as indicated by the following equation:

$$LM' = LM / \sum Ai \qquad (3)$$
$$= \sum (|i - LC| \times Ai) \sum Ai$$

In normal driving at the distribution characteristics such as shown in FIG. 14A, the luminance moment LM tends to become large because luminance are distributed all over in the horizontal direction.

Figure 14C:
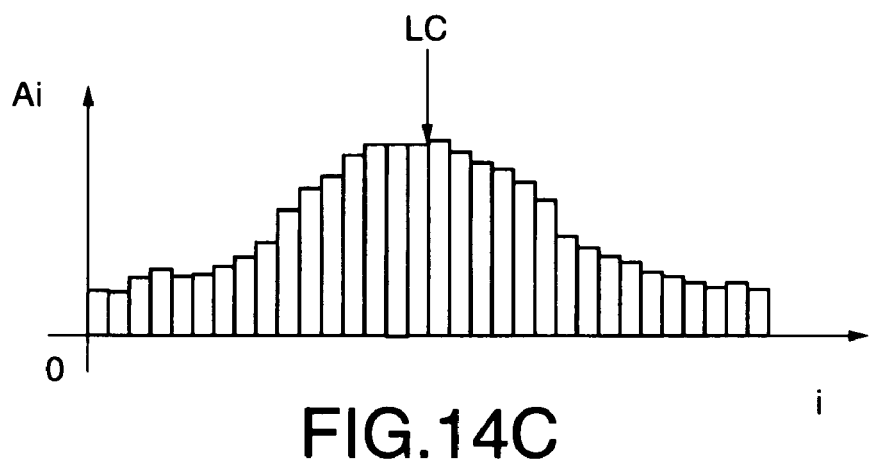

On the other hand, in the sunlight-facing driving at the distribution characteristics such as shown in FIG. 14C, the luminance moment LM tends to become small because the luminances are converged in the vicinity of the luminance center LC.

However, it is sometimes difficult to discriminate the sunlight-facing driving condition from a normal driving condition because the luminance moment LM becomes large for a bright image even in sunlight-facing driving.

In view of this, the normalized luminance moment LM' that is obtained by dividing the luminance moment LM by the total of addition of luminance Ai and that depends only on luminance distribution is used for the determination in step S6.

The normalized luminance moment LM' has a tendency of becoming large for the distribution characteristics shown in FIGS. 12A and 12B whereas small in FIGS. 13A and 13B.

In view of this, step S6 compares the normalized luminance moment the LM' with an appropriate reference value for detecting the weak-sunlight-facing driving condition that is shown in FIGS. 13A and 13B.

The equation (3) can be modified for a large weight of the addition of luminance Ai for evaluation of Ai distribution as follows:

$$LM'=\Sigma(|i-LC|\times Ai^2)/\Sigma Ai$$

$$LC=\Sigma(i\times Ai^2)/\Sigma Ai \quad (4)$$

In FIG. 5, when all the requirements in steps S1 to S6 are met, or all the fail-safe measure-interruption requirements are met, it is determined that the vehicle is facing a weak sunlight. A count flag Fcnt is then set at "1" (step S12). The count flag Fcnt is set at "0" when a counter K reaches the lower limit value 0 whereas "1" while the counter K is counting up or down (K≠0).

The counter K is set at a count value α (>0) in the following step S13.

Figure 15:
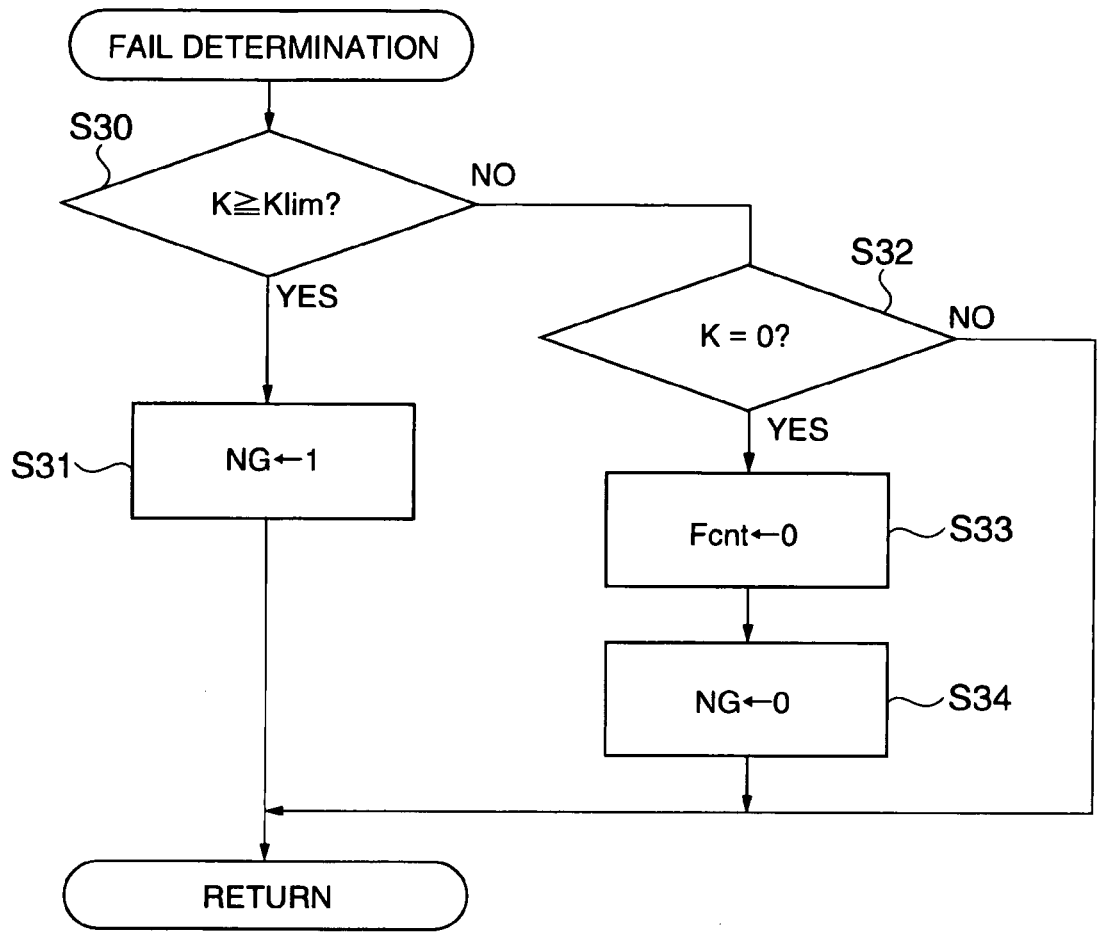
FIG. 15 shows a flow chart of a fail determination routine.

The counter K is used for a fail determining routine such as shown in FIG. 15 for determining whether to take fail-safe measures.

When the counter K reaches the upper limit value Klim (step S30) due to increment in the weak-sunlight-facing driving condition determining routine, a fail flag NG is set at "1" (step S31). On the other hand, when the counter K reaches the lower limit value 0 (step S32), the count flag Fcnt and the fail flag NG are both reset at "0" (steps S33 and S34).

Moreover, when the counter K is in the range from the lower limit value 0 to the upper limit value Klim, the routine ends via steps S30 and S32 with no change in the count flag Fcnt and the fail flag NG.

While a front-view monitoring is interrupted by the fail-safe measures (NG=1), it will not be resumed (fail-safe measures will not be released) unless the counter K reaches the lower limit value 0.

On the other hand, while the front-view monitoring is performed (NG=0), it will not be interrupted by the fail-safe measures unless the counter K reaches the upper lower limit value Klim.

The counter K starts the count-up when a fail-safe measure-interruption requirement is met. The fail flag NG is set at "1" when such a driving condition continues for a predetermined period (decided based on the upper limit value Klim and the count-up amount α) for taking the fail-safe measures. Monitoring is thus interrupted for avoiding a decrease in monitoring control accuracy in the weak-sunlight-facing driving.

Figure 16:
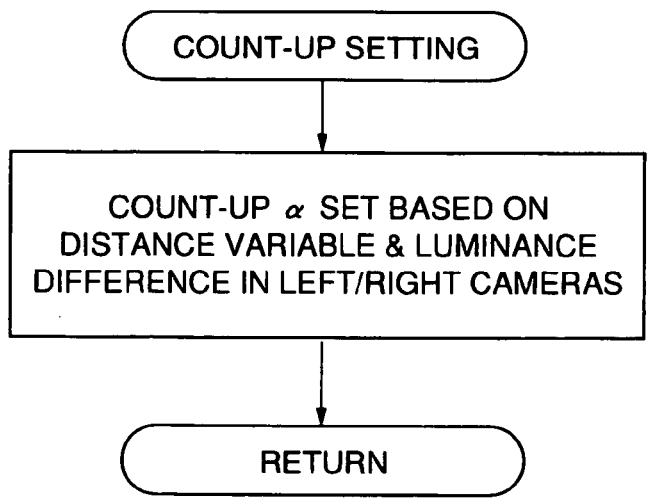
FIG. 16 shows a flow chart of a count-up amount setting routine.

The count-up amount a is decided according to a count-up amount setting routine shown in FIG. 16. The amount a is decided in accordance with a variance of distance and a difference in luminance in left and right cameras (step S20).

Usually, cameras are facing the sunlight in the sunlight-facing driving and hence the variation in calculation of the distance tends to be larger compared to a normal driving condition.

In view of such a tendency, the present invention obtains the variance of distance in a predetermined area in a monitored image, for example, an area extending in the vertical direction in the image. The count-up amount α is set at a large one when the variance is large. It is also set at a large amount in the sunlight-facing driving due to a larger luminance difference between the left and right cameras compared to the normal driving.

On the other hand, it is determined that the vehicle (the cameras 1 and 2) is not facing the sunlight if any one (or more) of the fail-safe measure-interruption requirements is (or are) not met through steps S1 to S6 in FIG. 5.

The routine then proceeds to step S7 in FIG. 6 to determine whether the count flag Fcnt has been set at "1", or the counter K has been counting up or down in step S7. If it is determined as K=0, the routines will not proceed anymore and ends.

As disclosed, monitoring is continued without taking any fail-safe measurements during the normal driving condition without facing sunlight and the count K having reached the lower limit value 0, or the fail flag NG having been set at "0".

On the contrary, when any one (or more) of the fail-safe measure-interruption requirements is (or are) not met through steps S1 to S6, but it is "YES" (Fcnt=1, K≠0) in step S7, the routine proceeds to step S8.

Steps S8 to S10 define fail-safe measure-release requirements for the counter K to count up or down to resume functions that have been interrupted by the fail-safe measures. The counter K will count down when a fail-safe measure-release requirement is met whereas count up when a requirement is not met.

The fail-safe measure-release requirements are not so severe than the fail-safe measure-interruption requirements for avoiding repetition of the fail-safe measures while it is repeated that the vehicle travelling ahead is lost and appeared on the monitoring screen.

As one of the fail-safe measure-release requirements, it is determined in step S8 whether the shutter speed "a" is 3000 μsec. or lower. If not, or this fail-safe measure-release requirement is met, the routine proceeds to step S11 in which the counter K counts down by a count-down amount β.

On the other hand, if "YES" in step S8, the routine proceeds to step S9 to determine whether the luminance-addition variance VAR is equal to or larger than the reference value.

The VTR tends to be large in the sunlight-facing driving condition because, particularly, when facing a strong sunlight, luminance-saturated sections appear on the monitor screen due to smears or sunlight-diffusion discs (FIG. 2) and also blackout sections.

However, VTR tends to be large not only in the sunlight-facing driving, but also, for instance, in a sunny day, due to a strong contrast between sunny and shade places. It tends to be large, particularly, there is the shade of guard rails or roadside trees along the road.

In view of such a tendency, the present invention deploys the luminance-addition variance VTR that will not vary so much in the weak-sunlight-facing driving compared to the normalized luminance-addition variance VTR', for the fail-safe measure-release requirements less severer than the fail-safe measure-interruption requirements, to avoid the repetition of fail-safe measures discussed above.

If "YES" instep S9 (FIG. 6), the routine proceeds to step S13 (FIG. 5) in which the counter K starts count-up. On the other hand, if "NO" in step S9, the routine proceeds to step S10 to determine whether lane markings have been accurately recognized. Accuracy on a lane marking recognition can be used as a fail-safe measure-release requirement for avoiding the repetition of the fail-safe measures discussed above. This is because the road surface will be mostly correctly displayed on the monitor screen and hence the lane marking recognition accuracy will not be lowered so much even in the weak-sunlight-facing driving.

If the lane marking recognition accuracy has been lowered in step S10, the routine proceeds to step S13 (FIG. 5) in which the counter K starts count-up.

On the other hand, if the lane marking recognition accuracy is not lowered in step S10, the routine proceeds to step S11 in which the counter K starts count-down.

The lane marking recognition accuracy can be determined as disclosed in Japanese Patent Application No. 11-269578. The accuracy of lane markings detected on a monitored image is determined based on the number of edges of luminance on the lane markings, the positional relationship (continuity) to the lane markings detected previously and parallelism between left and right lane markings. High lane marking recognition accuracy is achieved as the number of edges of luminance is larger, the lane markings detected in the present image more continues to the previously detected markings and the detected left and right markings are more parallel to each other.

As clearly understood from the foregoing disclosure, the fail-safe measure-release requirements (count-down requirements for the counter K) are as follows:

(1) the shutter speed "a" is higher than 3000 μse., or (2) if not, the luminance-addition variance VAR is smaller than the reference value and lane marking recognition is accurate.

As disclosed, the present invention monitors parameters such as the luminance-distribution characteristics parameter, the number of edges of luminance, the upper and lower luminance saturation factors and the luminance moment for detection of a weak-sunlight-facing driving condition.

The fail-safe measures can therefore be taken exactly during the weak-sunlight-facing driving, thus offering a highly reliable vehicle front-view monitoring system.

Particularly, in the present invention, several monitoring areas are set on the monitor screen, which are slit-like areas extending vertically on a monitored image for obtaining the luminance-distribution characteristic values (the luminance-addition variance VAR and the maximum addition of luminance Amax) in the horizontal direction of the image.

The luminance-distribution characteristic values are normalized using a shutter speed "a" for obtaining parameters (the luminance-addition variance VAR' and the normalized maximum addition of luminance Amax' ) that are highly related to weak-sunlight-facing driving.

The normalized parameters VAR' and Amax' can be used for detection of a weak-sunlight-facing condition, which is more accurate than using the un-normalized parameters VAR and Amax as the fail-safe measure-interruption requirements.

The fail-safe measure-release requirements are set as including several conditions in addition to a weak-sunlight-facing driving condition so that it is not so severe than those of the fail-safe measure-interruption requirements.

This requirement setting avoids the repetition of unnecessary fail-safe measures such as the warning which could irritate the driver while it is repeated that the vehicle travelling ahead is lost and appeared on the monitoring screen.

The fail-safe measure-interruption requirements include the normalized Luminance-addition characteristic values VAR' and Amax' whereas the fail-safe measure-release requirements include VAR and Amax, the parameters different from VAR' and Amax because those are not normalized.

Moreover, the fail-safe measure-release requirements include the accuracy on the lane marking recognition that is not deployed for the fail-safe measure-interruption requirements.

Deploying different parameters for the fail-safe measure-interruption/release requirements offers flexible fail-safe requirement settings that match an actual driving condition compared to setting in which reference values are changed between the interruption/release requirements for the same parameters.

The count-up amount α is adjusted based on the luminance difference between the left and right cameras and variance of distance data.

This adjustment offers variable settings for a fail-safe determination time from a moment at which the fail-safe measure-interruption requirements are met to a moment of taking fail-safe measures in accordance with actual driving conditions.

Disclosed so far is the vehicle front-view monitoring system that takes fail-safe measures against a weak-sunlight-driving condition in which the vehicle is travelling as facing the weak sunlight so that sunlight-diffusion discs appear on the monitor screen.

However, the present invention is applicable to not only such a weak-sunlight-driving condition but also another optical phenomenon such as smear occurring on a monitoring screen.

As disclosed, according to the present invention, optical irregularities occurring on the monitored images due to optical interfering can be accurately detected, thus, the fail-safe measures can be taken swiftly in response to such an optical phenomenon for securing the safety driving.

It is further understood by those skilled in the art that the foregoing description is a preferred embodiment of the disclosed device and that various change and modification may be made in the invention without departing from the spirit and scope thereof.

What is claimed is:

1. A vehicle front-view monitoring system for taking fail-safe measures comprising:
   a camera device for taking an image of a view in front;
   a calculator for calculating luminance data on the image, wherein the luminance data provides a source for a luminance-distribution characteristic value indicating a horizontal luminance-distribution on the image; and
   a determination section for determining whether there is a fail occurring on the image taken by the camera,
   wherein the determination section determines the fail based on a parameter obtained by normalizing the luminance-distribution characteristic value by a shutter speed for the camera device, and
   wherein the parameter is obtained by dividing the luminance-distribution characteristic value by the shutter speed for the camera device.

2. The vehicle front-view monitoring system according to claim 1, wherein the luminance data provides a source for the luminance-distribution characteristic value that includes the maximum value of addition of luminance on the image.

3. The vehicle front-view monitoring system according to claim 1, wherein the luminance data provides a source for the luminance-distribution characteristic value that includes a luminance-addition variance on the image.

4. The vehicle front-view monitoring system according to claim 1, wherein the luminance data include data related to luminance edges in a predetermined monitoring area on the image.

5. The vehicle front-view monitoring system according to claim 4, wherein the number of related to luminance edges data is the number of luminance edges.

6. The vehicle front-view monitoring system according to claim 4, wherein the number of data related to luminance edges is the number of distance data obtained by a pair of cameras of the camera device.

7. The vehicle front-view monitoring system according to claim 4, wherein the monitoring area is set on the upper section of the image where a vehicle running ahead is displayed.

8. The vehicle front-view monitoring system according to claim 1, wherein the calculator further calculates the number of data as another parameter related to luminance edges in a predetermined monitoring area on the image, the determination section determining the fail based on the parameters.

9. The vehicle front-view monitoring system for taking fail-safe measures according to claim 1,
wherein the calculator calculates the luminance data on the basis of luminance values of sample pixels in preset monitoring areas on the image, the preset monitoring areas are arranged on the image in a horizontal direction.

10. The vehicle front-view monitoring system for taking fail-safe measures according to claim 9,
wherein the calculator calculates sums of the luminance values in each preset monitoring areas and calculates the maximum value of the sums as the luminance-distribution characteristic value, and
wherein the determination section determines the fail based on the parameter which is obtained by normalizing the maximum value by the shutter speed.

11. The vehicle front-view monitoring system for taking fail-safe measures according to claim 9,
wherein the calculator calculates a variance value of the luminance values as the luminance-distribution characteristic value, and
wherein the determination section determines the fail based on the parameter which is obtained by normalizing the variance value by the shutter speed.

12. A vehicle front-view monitoring system for taking a fail-safe measure comprising:
a camera device for taking an image of a view in front;
a calculator for calculating luminance data on the image; and
a determination section for determining whether there is a fail occurring on the monitoring system based on the luminance data, the fail-safe measure being taken if the fail is occurring,
wherein the calculator calculates a luminance center as the luminance data, the luminance center corresponding to a horizontal position on the image at which there is a convergence of luminance, and the calculator calculates a luminance moment indicating a horizontal luminance distribution based on the luminance center and normalizes the luminance moment by dividing the luminance moment by a total of luminance values of sample pixels on the image,
the determination section determines the fail by evaluating the horizontal luminance distribution on the image based on the luminance center normalized luminance moment.

13. The monitoring system of claim 12, further comprising:
an image recognition device which receives image data from said camera device; and a vehicle state alteration device which is in communication with said image recognition device and alters a vehicle condition based on image data criteria;
wherein said fail-safe measures prevents the vehicle state alteration device from activating an image recognition based vehicle control change in said vehicle.

14. The monitoring system of claim 13 further comprising requirement means for determining whether one or more of the fail safe interruption criteria is present, which requirement means is associated with one or more of the following criteria;
a) that an upper luminance saturation factor LR1 is larger than a lower luminance saturation factor LR2;
b) that a number of luminance edges EN of an area of the vehicle in front is smaller than a reference number;
c) that a number of the calculation of the distance data is smaller than a reference number;
d) that a luminance-distribution characteristics parameter normalized by a shutter speed VAR' is greater than a reference value;
e) that a maximum addition of luminance normalized by a shutter speed Amax' is larger than a reference value,
f) that a normalized luminance moment LMt is smaller than center corresponding to a horizontal position on the image which there is a convergence of luminance that is smaller than a reference value.

15. The monitoring system of claim 14 wherein the requirement means determines that a fail safe mode interruption is appropriate if one or more of criteria a to f is not satisfied.

16. The monitoring system of claim 14 wherein the requirement means determines that a fail safe mode interruption is appropriate if just one of criteria a to f is not satisfied.

17. The monitoring system of claim 14 wherein the requirement means determines that fail safe mode activation is appropriate if one or more of criteria a to f is satisfied.

18. The monitoring system of claim 14 wherein the requirement means determines that fail safe mode activation is appropriate if two or more of criteria a to f are satisfied.

19. The monitoring system of claim 14 wherein the requirement means determines that fail safe mode activation is appropriate only if all of criteria a to f are satisfied.

20. The monitoring system of claim 13 wherein said determination section prevents said fail-safe measures from activating if a vehicle is recognized ahead or a distance to a vehicle is detected based on said image recognition device.

21. The monitoring system of claim 13 wherein said determination section includes means for preventing said fail-safe measures from activating based on camera shutter speed.

22. The monitoring system of claim 12, wherein said fail-safe measures precludes activation of an image recognition based vehicle control change until conditions are sensed by said monitoring system that a luminance state is acceptable for proper monitoring system functioning.

23. A vehicle front-view monitoring system, comprising:
a camera device which is mounted on the vehicle for taking an image of a view in front of the vehicle;
an image recognition device which receives image data from said camera device;
a vehicle state alteration device which is in communication with said image recognition device and alters a vehicle condition based upon image data criteria when there is deemed not to be a monitoring system failure;
a determination section for determining whether there is a monitoring system failure based on a luminance state condition; and
a fail safe implementation device which places said monitoring system in a fail safe mode based on the determination section determining a luminance based monitoring system failure has occurred, which fail safe mode precludes an activity in said vehicle state alteration device; and
requirement means for determining whether one or more fail safe interruption criteria is present, which requirement means is associated with one or more of the following criteria:
a) that an upper luminance saturation factor LR1 is larger than a lower luminance saturation factor LR2;
b) that a number of luminance edges EN of an area of the vehicle in front is smaller than a reference number;

c) that a number of the calculation of the distance data is smaller than a reference number;
d) that a luminance-distribution characteristics parameter normalized by a shutter speed VAR' is greater than a reference value;
e) that a maximum addition of luminance normalized by a shutter speed Amax' is larger than a reference value; and
f) that a normalized luminance moment LM' is smaller than center corresponding to a horizontal position on the image which luminance are converged is smaller than a reference value, wherein said requirement means determining that fail safe mode activation is appropriate only if all of criteria a to fare satisfied, wherein said luminance state condition is a luminance condition deemed to present a potential for a lowered monitoring accuracy condition, and wherein said fail safe implementation device precludes any activity in said vehicle state alteration device until a restatement condition, wherein monitoring accuracy is judged acceptable, is established.

24. The monitoring system of claim 23, further comprising a calculator for calculating luminance data on the image;
wherein said determination section for determining whether there is a monitoring system failure occurring on the monitoring system based on a luminance state condition determines whether there is a monitoring system failure based on luminance calculations derived from said calculator.

25. The monitoring system of claim 23 wherein said vehicle condition to be altered is a warning system and said fail-safe implementation device prevents said warning system from activating.

26. The monitoring system of claim 23 wherein said fail safe implementation device prevents the vehicle state alteration device from activating a vehicle control change in said vehicle.

27. The monitoring system of claim 26 wherein the vehicle control change of said vehicle state alteration device, which is precluded from activating in the fail safe mode, is a vehicle slow down control change.

28. The monitoring system of claim 23, wherein said determination section for determining whether there is a monitoring system failure occurring on the monitoring system based on a luminance state condition determines whether there is a luminance state condition failure based on luminance calculations, and said fail safe implementation device prevents said vehicle state alteration device from activating an image recognition based vehicle control change in said vehicle.

29. The monitoring system of claim 23, wherein said determination section for determining whether there is a monitoring system failure occurring on the monitoring system based on a luminance state condition determines whether there is a monitoring system failure based on optical irregularities occurring on monitored images, and said fail safe implementation device prevents said vehicle state alteration device from activating an image recognition based vehicle control change in said vehicle.

* * * * *